United States Patent
Xiao

(10) Patent No.: US 10,138,399 B2
(45) Date of Patent: Nov. 27, 2018

(54) SEALANT COMPOSITION AND METHOD OF PREPARING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Ang Xiao, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 14/429,186

(22) PCT Filed: Jun. 12, 2014

(86) PCT No.: PCT/CN2014/079748
§ 371 (c)(1),
(2) Date: Mar. 18, 2015

(87) PCT Pub. No.: WO2015/109733
PCT Pub. Date: Jul. 30, 2015

(65) Prior Publication Data
US 2016/0032155 A1 Feb. 4, 2016

(30) Foreign Application Priority Data
Jan. 27, 2014 (CN) .......................... 2014 1 0039822

(51) Int. Cl.
| | |
|---|---|
| *C09J 133/14* | (2006.01) |
| *C09J 4/00* | (2006.01) |
| *C08K 3/36* | (2006.01) |
| *C08K 5/544* | (2006.01) |
| *C08G 59/34* | (2006.01) |
| *C08G 59/40* | (2006.01) |

(52) U.S. Cl.
CPC ............ *C09J 133/14* (2013.01); *C08G 59/34* (2013.01); *C08G 59/4085* (2013.01); *C08K 3/36* (2013.01); *C08K 5/544* (2013.01); *C09J 4/00* (2013.01)

(58) Field of Classification Search
CPC .. C09J 4/00; C09J 133/14; C08K 3/36; C08K 5/554; C08G 59/34; C08G 59/4085
USPC .................................................... 522/100, 44
See application file for complete search history.

(56) References Cited

FOREIGN PATENT DOCUMENTS

| CN | 103146310 A | * 6/2013 | |
| CN | 103146310 A | 6/2013 | |
| CN | 103173159 A | 6/2013 | |
| CN | 103146310 A1 | * 1/2014 | ............... C09J 4/02 |
| CN | 103788880 A | 5/2014 | |
| JP | H05295087 A | 11/1993 | |
| JP | 2007178473 A | 7/2007 | |
| JP | 2011221168 A | 11/2011 | |

OTHER PUBLICATIONS

Product Description for KH-570 from Zhejiang Feidian Chemical Co. Ltd. [online]. Retrieved online on [Feb. 4, 2017]. Retrieved from internet <URL//http://www.chemnet.com/ChinaSuppliers/16352/KH-570--1603252.html>>.*
Product Description for KH-550 from Hangzhou Feidian Chemical Co. Ltd. [online]. Retrieved online on [Feb. 3, 2017]. Retrieved from internet <URL//http:/http://www.tecmos.com/carga/empresas/archivos/871ae711904c91411daed56b2d3847e8.pdf>.*
Oct. 31, 2014 (CN) International Search Report and Written Opinion for PCT/CN2014/0479748.
Oct. 31, 2014 (CN) Written Opinion for PCT/CN2014/0479748—Eng Tran.
Oct. 23, 2014 (CN) First Office Action—priority Application No. 201410039822.0 and its English translation.
Mar. 12, 2015 (CN) Second Office Action—priority Application No. 201410039822.0 and its English translation.

* cited by examiner

*Primary Examiner* — Sanza L. McClendon
(74) *Attorney, Agent, or Firm* — Banner & Witcoff, Ltd.

(57) ABSTRACT

Disclosed are a sealant composition and a method of preparing the same wherein the sealant composition comprises: 70-80 wt % of a low-viscosity epoxy acrylate conforming to the structure of Formula I, 0.5-1 wt % of a photoinitiator, 5-15 wt % of silica microspheres, 5-15 wt % of resinous elastic microspheres, and 1-2 wt % of silane coupling agent, based on the total weight of the sealant composition wherein $R_1$ and $R_2$ are as defined herein. The sealant has improved coating linearity.

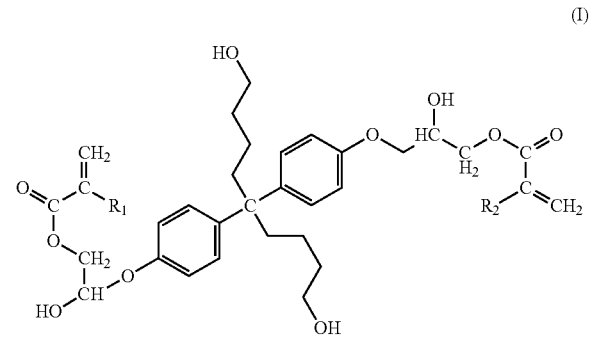

2 Claims, 2 Drawing Sheets

SEALANT COMPOSITION AND METHOD OF PREPARING THE SAME

The application is a U.S. National Phase Entry of International Application No. PCT/CN2014/079748 filed on Jun. 12, 2014, designating the United States of America and claiming priority to Chinese Patent Application No. 201410039822.0 filed on Jan. 27, 2014. The present application claims priority to and the benefit of the above-identified applications and the above-identified applications are incorporated by reference herein in their entirety.

INVENTION FIELD

Embodiments of the present invention relates to a sealant composition and a method of preparing the same.

BACKGROUND

For improving the appearance aesthetics of liquid crystal displays (LCDs) and increasing the area having "touch-move" function, narrow-bezel LCDs are hotspot in LCD panel researches. One technical problem during the manufacture of narrow bezel LCD panels is how to reduce the width of sealant for bonding substrates.

The width of sealant in existing LCD panels is generally between 0.7 and 1.0 mm, while the width of sealant in narrow bezel LCD panel products can be usually 0.5 mm or less. With respect to sealants having a width of 0.5 mm or less, the coating linearity is especially important. FIG. 2 shows a morphology of a traditional sealant with a coating width of 0.5 mm as observed under microscope. From the photomicrograph, it can be seen that the 0.5 mm-wide traditional sealant exhibits, when coated, irregular zigzag edges and poor linearity, which may result in relatively large fluctuations of the sealant width, and affect the bonding property and liquid crystal impact resistant property of the sealant.

Chinese Patent Application Publication No. 103205216A discloses a sealant and a method of preparing the same. The sealant comprise 60-70 wt % of a low-viscosity epoxy acrylic photocurable resin; 1-5 wt % of an epoxy resin; 0.5-1 wt % of a photoinitiator; 5-10 wt % of a thermocuring agent; 1-2 wt % of a coupling agent; 5-10 wt % of organic powders; 5-10 wt % of inorganic powders; and 1-5 wt % of porous glass microspheres treated with inert gas. The method comprises: (1) mixing the components for constituting the sealant to give a mixture; (2) compounding the mixture; and (3) degassing the compounded mixture. The sealant of that application can inhibit the occurrence of liquid crystal puncturing phenomenon in LCD panels when coated around the periphery of underlying substrates because it comprises porous glass microspheres treated with inert gas.

However, although the aforesaid technical solution good performances for solving the puncturing defect problem, the overall property thereof is still required to be improved since it comprise an epoxy resin and a thermocuring component, while the size range of filler component is unfavorable for the linearity of coated sealant.

Thus, there is still a need of sealant compositions having improved coating linearity.

SUMMARY OF INVENTION

To address the aforesaid problems, embodiments of the present invention provide a sealant composition and a method of preparing the same. The linearly coating performance of sealant is improved by optimizing the combination of components, reducing the size of filler components in the sealant, and changing the ratio of resin to filler. The experimental results indicate that the sealant in accordance with the embodiments of the present invention exhibits, when coated with 0.5 mm width, regular and clear edges, good linearity and relatively small width fluctuations, as compared to traditionally sealants.

An embodiment of the present invention provides a sealant composition comprising:

(a) 70-80 wt % of the low-viscosity epoxy acrylate conforming to the structure of Formula I;

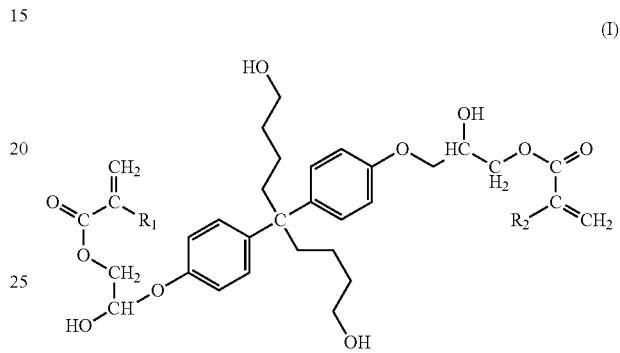

wherein $R_1$ and $R_2$ are each independently selected from the group consisting of methyl, ethyl, propyl, isopropyl, butyl, isobutyl, and tert-butyl;

(b) 0.5-1 wt % of a photoinitiator;
(c) 5-15 wt % of silica microspheres;
(d) 5-15 wt % of resinous elastic microspheres; and
(e) 1-2 wt % of a silane coupling agent, based on the total weight of the sealant composition.

Another embodiment of the present invention provides a method of preparing the sealant composition comprising: mixing and stirring all the components except the low-viscosity epoxy acrylate at a temperature of 20-30° C. for 30-60 min; compounding the mixture at a temperature of 30-50° C. twice, each time for 20-40 min; degassing the compounded mixture; and adding the low-viscosity epoxy acrylate to adjust the viscosity of the sealant, to produce the desired sealant composition.

By using the aforesaid technical solutions, the present invention provides a high-quality sealant composition which improves substantially the coating linearity of sealant by reducing the sizes of the silica microspheres and the resinous elastic microspheres, removing the thermocuring agent and the epoxy resin that are commonly used in traditional sealants, and selecting an appropriate combination of components.

DETAILED DESCRIPTION OF INVENTION

Figure 1:
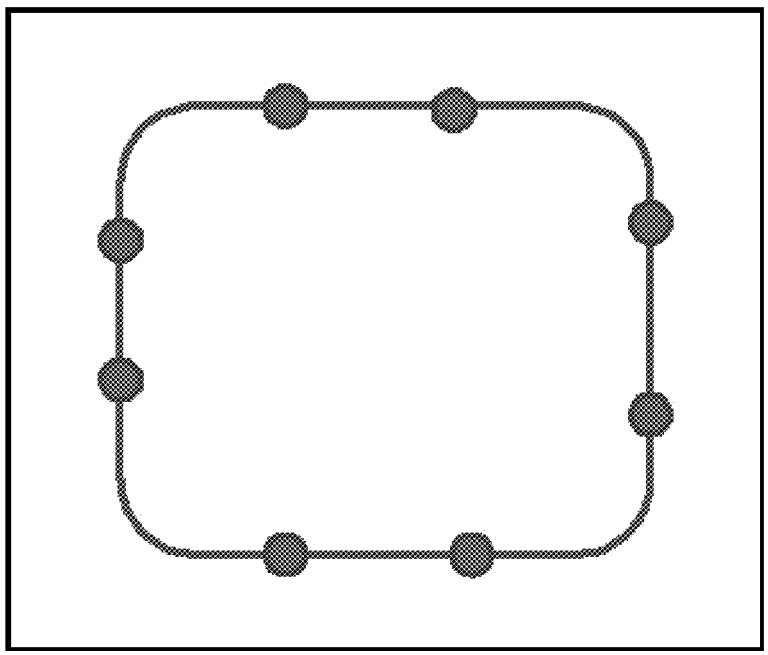
FIG. 1 shows a schematic view of distribution of test points in the coated sealant.

Hereinafter, the embodiments of the present invention are further described in detail with reference to the drawings and examples.

An embodiment of the present invention comprises:
(a) 70-80 wt % of a low-viscosity epoxy acrylate conforming to the structure of Formula I;

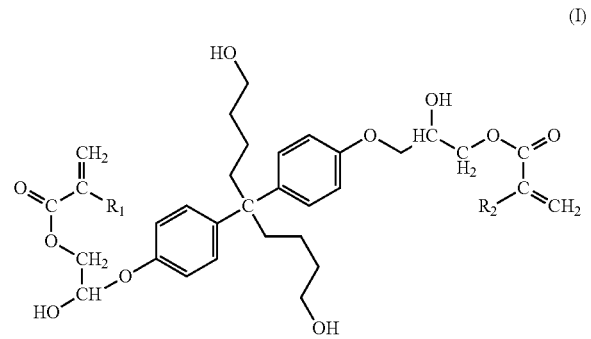

wherein $R_1$ and $R_2$ are each independently selected from the group consisting of methyl, ethyl, propyl, isopropyl, butyl, isobutyl, and tert-butyl;
(b) 0.5-1 wt % of a photoinitiator;
(c) 5-15 wt % of silica microspheres;
(d) 5-15 wt % of resinous elastic microspheres; and
(e) 1-2 wt % of a silane coupling agent,
based on the total weight of the sealant composition.

In an aspect, $R_1$ and $R_2$ of the low-viscosity epoxy acrylate may be each independently selected from the group consisting of methyl, ethyl, and propyl.

The low-viscosity epoxy acrylate conforming to the structure of Formula I suitable for use in the embodiments of the present invention may be commercially available, or can be produced, e.g., in accordance with the method as described in Chinese Patent Application Publication No. 103205216A.

In another aspect, the photoinitiator suitable for use in the embodiments of the present invention may be any product that is suitable for use in sealants as known in the art. For instance, the photoinitiator may be one or more selected from the group consisting of α-diethoxy acetophenone, α-hydroxyalkyl phenone, and α-aminoalkyl phenone.

In another aspect, the silica microspheres suitable for use in the embodiments of the present invention may have a diameter of 0.5-0.9 μm, e.g., 0.6-0.8 μm.

In another aspect, the elastic resinous microspheres suitable for use in the embodiments of the present invention may have a diameter of 0.1-0.5 μm, e.g., 0.2-0.4 μm. The elastic resinous microspheres may be, e.g., acrylic resinous microspheres, e.g., those as known in the art. The primary effect of the elastic resinous microspheres in the embodiments of the present invention is to increase the overall tenacity and bonding of the sealant. Microspheres having a smaller size may improve the coating linearity of the sealant because with decreasing of microsphere diameter, the surface tension of the resin decreases as a whole when it diffuses and finds its level around the microspheres.

In general, the silica microspheres in a traditional sealant have a diameter of 1-2 μm, and comprise 15-20 wt % of the sealant; the elastic resinous microspheres have a diameter of 0.5-1 μm and comprise 15-20 wt % of the sealant; and the specific weight of the resin is 60-65 wt %. The use of such traditional sealants are limited because the microsphere fillers having a relatively large size diffuse more slowly during cell assembly after coating, while the resinous components diffuse more rapidly, so that the coated sealant will have irregular zigzag edges. The sealant in accordance with the embodiments of the present invention improves substantially the linearly coating performance of the sealant by reducing the amount and size of the microsphere fillers, while selecting a low-viscosity epoxy acrylate in a specific amount in combination with a specific photoinitiator and a silane coupling agent.

In another aspect, the silane coupling agent suitable for use in the embodiments of the present invention may be theoretically any appropriate product that has been disclosed by the prior art. The particular examples thereof may be, e.g., γ-methyl-acryloxypropyl-trimethoxysilane (KH570) or γ-aminopropyltriethoxysilane (KH550). The two coupling agents have desirable synergic effect with the aforesaid other components, and are capable of increasing the bonding between the resinous components and the glass surfaces.

A preferable embodiment of the present invention provides a sealant composition comprising: (a) 75-78 wt % of the low-viscosity epoxy acrylate conforming to the structure of Formula I; (b) 0.6-0.8 wt % of a photoinitiator; (c) 8-12 wt % of silica microspheres; (d) 8-12 wt % of elastic resinous microspheres; and (e) 1.2-1.8 wt % of silane coupling agent.

In addition to the components as defined above, the sealant composition in accordance with the embodiments of the present invention may further comprise additional functional additives. Such additional functional additives and the amounts thereof may be appropriately selected and adjusted by persons skilled in the art in accordance with the practical requirements, and are not particularly limited in the present invention.

Another embodiment of the present invention provides a method of preparing the sealant composition as defined above. The method comprises: mixing and stirring all the components excepting the low-viscosity epoxy acrylate at a temperature of 20-30° C. for 30-60 min; compounding the mixture at a temperature of 30° C.-50° C., each time for 20-40 min; degassing the compounded mixture; and adding the low-viscosity epoxy acrylate to adjust the viscosity of the sealant, to produce the desired sealant composition.

Of those, it is preferable to mix and stir all the components excepting the low-viscosity epoxy acrylate at a temperature of 20° C. for 40 min; compound the mixture at a temperature of 40° C. twice, each time for 30 min; degassing the compounded mixture; and adding the low-viscosity epoxy acrylate to adjust the viscosity of the sealant to 250±10 Pa·s, to produce the desired sealant composition.

Hereinafter the present invention is further described with reference to the following examples. It is to be understood that these examples are only for the illustrative purpose, and not intended to limit the scope of the present invention.

Example 1

The sealant composition of this example comprised: 80 wt % of the low-viscosity epoxy acrylate conforming to the structure of Formula I; 1 wt % of the photoinitiator; 10 wt % of the silica microspheres; 7 wt % of the elastic resinous microspheres; and 2 wt % of the silane coupling agent, based on the total weight of the sealant composition.

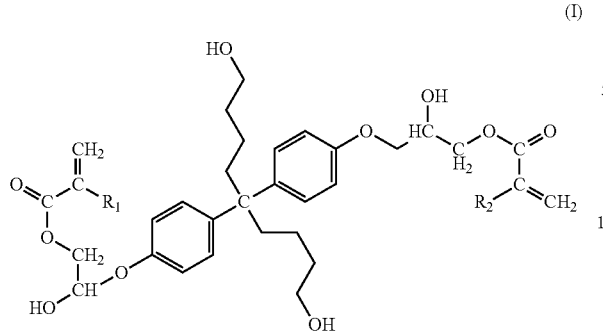

(I)

wherein $R_1$ and $R_2$ were both propyl, and wherein the photoinitiator was α-diethoxy acetophenone, the elastic resinous microspheres were acrylic resinous microspheres (with a diameter of 0.1-0.2 μm); the silane coupling agent was KH550; and the silica microspheres had a diameter of 0.5-0.6 μm.

The sealant composition were prepared by: mixing and stirring all the components except the low-viscosity epoxy acrylate at 30° C.; compounding the mixture at 35° C. twice, each time for 30 min; degassing the compounded mixture; and adding the low-viscosity epoxy acrylate to adjust the viscosity of the sealant to 250±10 Pa·s, to produce the desired product.

Example 2

The sealant of this example comprised: 70 wt % of the low-viscosity epoxy acrylate conforming to the structure of Formula I; 0.5 wt % of the photoinitiator; 15 wt % of the silica microspheres; 13.5 wt % of the elastic resinous microspheres; and 1 wt % of the silane coupling agent;

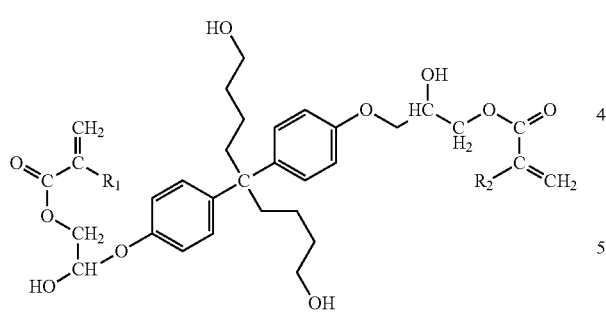

(I)

wherein $R_1$ was methyl, and $R_2$ was ethyl; and wherein the photoinitiator was α-hydroxyalkyl phenone; the elastic resinous microspheres was acrylic resinous microspheres (with a diameter of 0.2-0.4 μm); the silane coupling agent was KH570, and the silica microspheres had a diameter of 0.6-0.8 μm.

The sealant composition were prepared by: mixing and stirring all the components except the low-viscosity epoxy acrylate at 25° C. for 50 min; compounding the mixture 35° C. twice, each time for 25 min; degassing the compounded mixture; and adding the low-viscosity epoxy acrylate to adjust the viscosity of the sealant to 250±10 Pa·s, to produce the desired product.

Example 3

The sealant of this example comprised: 76 wt % of the low-viscosity epoxy acrylate conforming to the structure of Formula I; 0.6 wt % of the photoinitiator; 10 wt % of the silica microspheres; 12 wt % of the elastic resinous microspheres; and 1.4 wt % of the silane coupling agent.

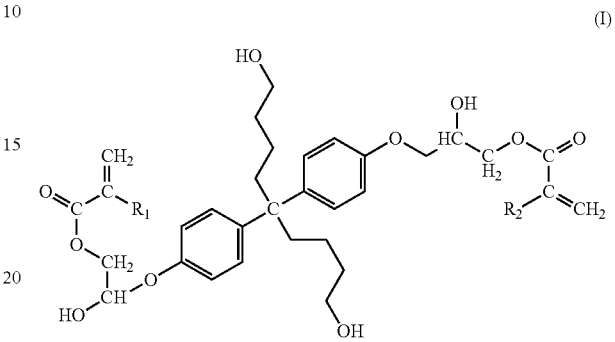

(I)

wherein $R_1$ was methyl, and $R_2$ was propyl; and wherein the photoinitiator was α-aminoalkyl phenone; the elastic resinous microspheres was acrylic resinous microspheres (with a diameter of 0.3-0.4 μm); the silane coupling agent was γ-aminopropyltriethoxysilane, and the silica microspheres had a diameter of 0.7-0.8 μm.

The sealant composition were prepared by: mixing and stirring all the components except the low-viscosity epoxy acrylate at 30° C. for 30 min; compounding the mixture at 50° C. twice, each time for 20 min; degassing the compounded mixture; and adding the low-viscosity epoxy acrylate to adjust the viscosity of the sealant to 250±10 Pa·s, to produce the desired product.

Example 4

The sealant of this example comprised: 78 wt % of the low-viscosity epoxy acrylate conforming to the structure of Formula I; 0.8 wt % of the photoinitiator; 12 wt % of the silica microspheres; 8 wt % of the elastic resinous microspheres; and ×1.2 wt % of; silane coupling agent.

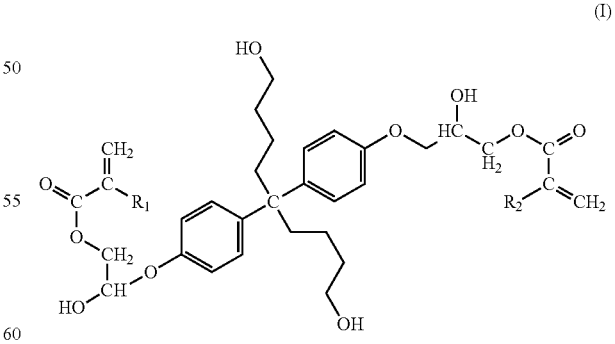

(I)

wherein $R_1$ was ethyl, and $R_2$ was propyl; and wherein the photoinitiator was α-diethoxy acetophenone; the elastic resinous microspheres was acrylic resinous microspheres (with a diameter of 0.4-0.5 μm); the silane coupling agent was KH550, and the silica microspheres had a diameter of 0.7-0.8 μm.

The sealant composition were prepared by: mixing and stirring all the components except the low-viscosity epoxy acrylate at 20° C. for 60 min; compounding the mixture at 30° C. twice, each time for 40 min; degassing the compounded mixture; and adding the low-viscosity epoxy acrylate to adjust the viscosity of the sealant to 250±10 Pa·s, to produce the desired product.

Example 5

The sealant of this example comprised: 75 wt % of the low-viscosity epoxy acrylate conforming to the structure of Formula I; 0.8 wt % of the photoinitiator; 9 wt % of the silica microspheres; 14 wt % of the elastic resinous microspheres; and 1.2 wt % of the silane coupling agent.

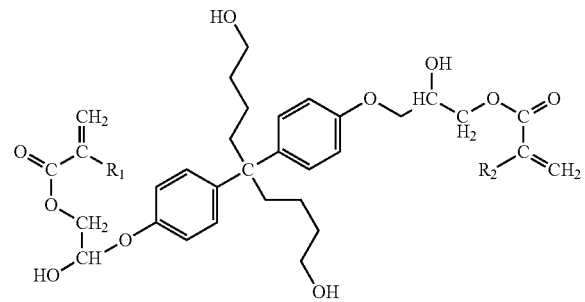

(I)

wherein $R_1$ and $R_2$ are both methyl; and wherein the photoinitiator was α-diethoxy acetophenone; the elastic resinous microspheres was acrylic resinous microspheres (with a diameter of 0.3-0.5 μm); the silane coupling agent was KH550, and the silica microspheres had a diameter of 0.8-0.9 μm.

The sealant composition were prepared by: mixing and stirring all the components except the low-viscosity epoxy acrylate at 20° C. for 40 min; compounding the mixture at 40° C. twice, each time for 30 min; degassing the compounded mixture; and adding the low-viscosity epoxy acrylate to adjust the viscosity of the sealant to 250±10 Pa·s, to produce the desired product.

Test Example 1

This test example tested the comprehensive performances of sealants in accordance with the embodiments of the present invention and traditional sealants.

Test Objects:

Test Sealant 5: the sealant prepared in accordance with Example 5.

Control Sealant 1: UR-2920, Mitsui Chemicals, Japan

Control Sealant 2: the sealant prepared in accordance with Example 1 of Chinese Patent Application Publication No. 103205216A Test method: A sealant was applied onto a 100 mm×100 mm white glass plate to form a continuous, substantially rectangular, closed frame (with a coating width of 0.5 mm) at 5 mm away from the periphery edges of the plate. The coating conditions are shown in Table 1 below.

TABLE 1

|  | Test Sealant | Control Sealant 1 | Control Sealant 2 |
| --- | --- | --- | --- |
| Coating pressure | 0.27 MPa | 0.3 MPa | 0.3 MPa |
| Sealant height | 5 μm | 5 μm | 5 μm |
| Height of coating Nozzle away from substrate | 25 μm | 25 μm | 25 μm |
| Coating Speed | 100 mm/sec | 100 mm/sec | 100 mm/sec |

After the sealant was cured, two spots were so selected from each of the four edges of the formed substantially rectangular closed frame as test points that the two test points on each edge divided the edge to three substantially equal sections. The dry width data of the selected test points were listed in Table 2. (In FIG. 1, the first point on the left of the upper edge of the rectangle was marked as "test point 1", and the remainder points were in turn marked as test points 2 to 8 clockwise.)

TABLE 2

|  | Test Sealant | Control Sealant 1 | Control Sealant 2 |
| --- | --- | --- | --- |
| Average cross-sectional area of sealant perpendicular to the coated plane | 2600 μm² | 2600 μm² | 2653 μm² |
| Dry width of test point 1 | 0.52 mm | 0.54 mm | 0.55 mm |
| Dry width of test point 2 | 0.51 mm | 0.55 mm | 0.56 mm |
| Dry width of test point 3 | 0.55 mm | 0.51 mm | 0.43 mm |
| Dry width of test point 4 | 0.56 mm | 0.46 mm | 0.50 mm |
| Dry width of test point 5 | 0.54 mm | 0.58 mm | 0.49 mm |
| Dry width of test point 6 | 0.47 mm | 0.58 mm | 0.57 mm |
| Dry width of test point 7 | 0.48 mm | 0.46 mm | 0.55 mm |
| Dry width of test point 8 | 0.53 mm | 0.57 mm | 0.49 mm |
| Average of dry width of sealant | 0.52 mm | 0.53 mm | 0.52 mm |
| standard deviation | 0.0009 | 0.002 | 0.048 |

Figure 2:
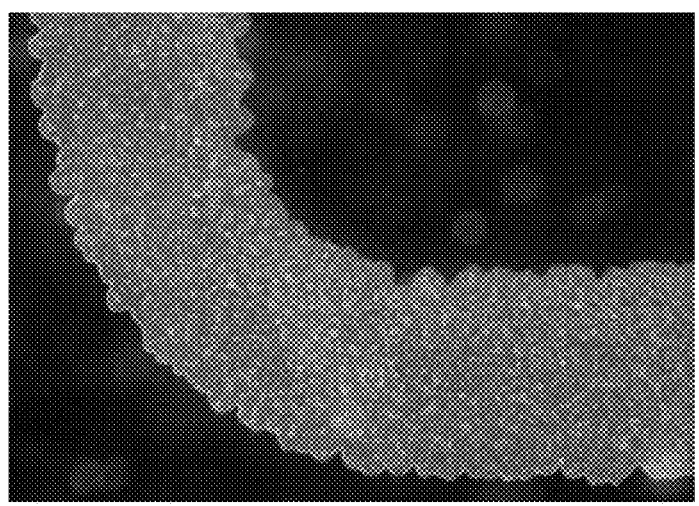
FIG. 2 shows a morphology of a commercially available sealant, UR-2920, with a coating width of 0.5 mm as observed under microscope.
Figure 3:
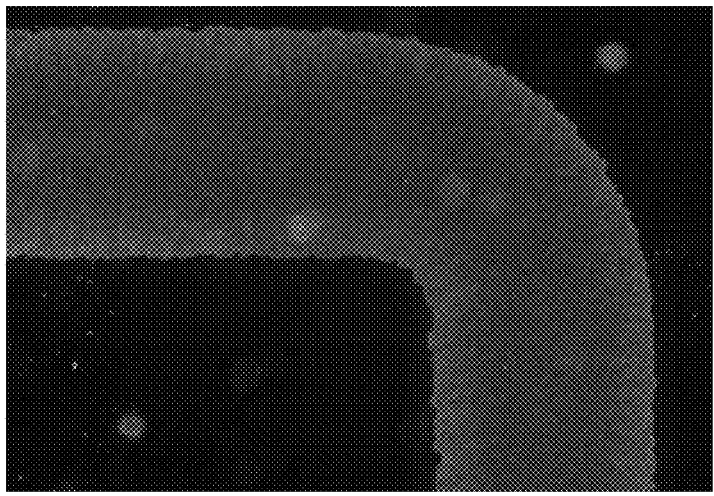
FIG. 3 shows a morphology of the sealant in accordance with the embodiments of the present invention with a coating width of 0.5 mm as observed under microscope.
Figure 4:
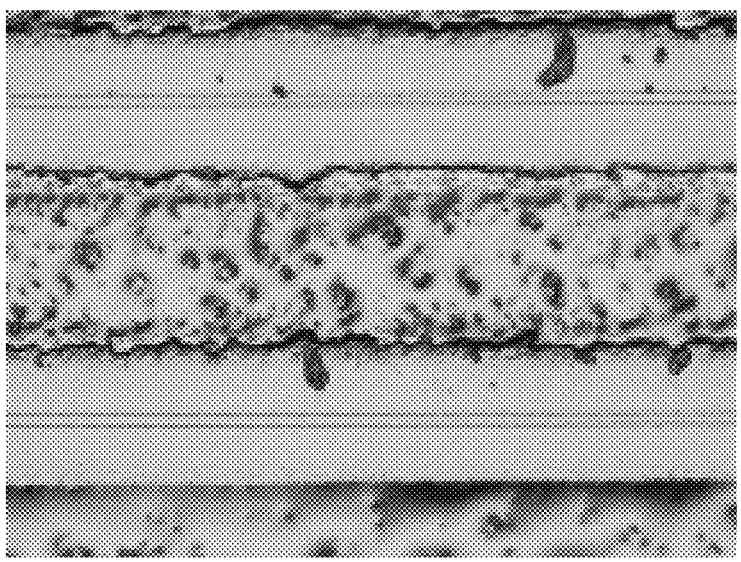
FIG. 4 shows a morphology of the control sealant 2 (i.e., the sealant in accordance with Chinese Patent Application Publication No. 103205216A) with a coating width of 0.5 mm as observed under microscope.

It can be seen from the data in Table 2 that the sealant prepared in accordance with Example 5 of the present invention have relatively small standard deviation when the coated width is 0.5 mm, and thus may be stably applied. The photomicrographs in FIG. 2, FIG. 3, and FIG. 4 indicate that the sealant in accordance with the embodiments of the present invention exhibits substantially improved edge zigzag phenomenon when the coated width is 0.5 mm, and are substantially superior as compared with the prior art.

Moreover, the aforesaid experiments were repeated by using the sealants prepared in accordance with Examples 1 to 4 of the present invention, and the experimental results are as follows:

the standard deviation of the dry width of the sealant of Example 1 is 0.0011 when the coated width is 0.5 mm;

the standard deviation of the dry width of the sealant of Example 2 is 0.0012 when the coated width is 0.5 mm;

the standard deviation of the dry width of the sealant of Example 3 is 0.0010 when the coated width is 0.5 mm; and the standard deviation of the dry width of the sealant of Example 4 is 0.0009 when the coated width is 0.5 mm;

Test Example 2

Comparison of Bonding Strength

Test method: A sealant was applied onto a 40 mm×45 mm white glass plate to form a continuous, substantially rectangular, closed frame at 5 mm away from the periphery edges of the plate so that the cross-sectional area of the sealant perpendicular to the coated plane was 4000±400 μm². Then, the white glass plate was assembled with another white glass plate (36 mm×36 mm) under vacuum so that the gap between the two pieces of glass plates were 5 μm. After UV radiation (5000 mJ/cm²) and thermocuring (120° C., 1 hour), the assembly was tested for its peel strength. The particular test method was: a machine hand was used to apply perpendicularly forces to the four angles of the white glass plate (40 mm×45 mm) at a constant speed of 5 mm/min, so that the two glass plates were just separated. At that time, the applied force was recorded for calculating the peel strength.

Test Objects and Test Results:
Test Sealant 1: the sealant of Example 5, 22N/cm²;
Test Sealant 2: the sealant of Example 5, 21.2N/cm²;
Test Sealant 3: the sealant of Example 5, 21.5N/cm²;
Test Sealant 4: the sealant of Example 5, 21.8N/cm²
Test Sealant 5: the sealant of Example 5, 21N/cm²;
Control Sealant 1: UR-2920, Mitsui Chemicals, Japan, 14 N/cm²;
Control Sealant 2: the sealant prepared in accordance with Example 1 of Chinese Patent Application Publication No. 103205216A; 18 N/cm².

It can be seen from the above results that the sealant in accordance with the embodiments of the present invention exhibits substantially improved bonding strength.

The technical solutions of the aforesaid examples can be further combined or replaced, and the examples are only used to illustrate the preferable examples of the present invention, and not intended to limit the spirit and scope of the present invention. Without departing the design concept of the present invention, various modification or improvements made by persons of skills in the art are encompassed within the present invention.

The present application claims the priority benefit of Chinese Patent Application NO. 201410039822.0 filed on Jan. 27, 2014, the disclosure of which is entirely introduced herein as a portion of the present invention.

I claim:

1. A method of preparing a sealant composition, wherein the sealant composition comprises:

(a) from >75 wt % to 80 wt % of a low-viscosity epoxy acrylate conforming to the structure of Formula I;

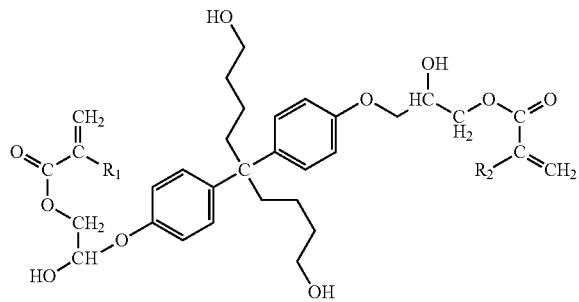

wherein $R_1$ and $R_2$ are each independently selected from the group consisting of methyl, ethyl, propyl, isopropyl, butyl, isobutyl, and tert-butyl;
(b) 0.5-1 wt % of a photoinitiator;
(c) 5-15 wt % of silica microspheres having a diameter of 0.5-0.9 μm;
(d) 5-15 wt % of resinous elastic microspheres; and
(e) 1-2 wt % of silane coupling agent,
based on a total weight of the sealant composition,
the method comprising: mixing and stirring all components, except the low-viscosity epoxy acrylate, at a temperature of 20-30° C. for 30-60 min; compounding the mixture at a temperature of 30° C.-50° C. twice, each time for 20-40 min; degassing the compounded mixture; and then adding the low-viscosity epoxy acrylate to adjust a viscosity of the degassed compounded mixture, to produce the sealant composition.

2. The method of claim 1, wherein the mixing and stirring all of the components, except the low-viscosity epoxy acrylate, is at a temperature of 20° C. for 40 min; the compounding the mixture is at a temperature of 40° C. twice, each time for 30 min; and the adding the low-viscosity epoxy acrylate is to adjust the viscosity of the degassed compounded mixture to 250±10 Pa·s.

* * * * *